(12) United States Patent
Pou et al.

(10) Patent No.: US 11,815,027 B2
(45) Date of Patent: Nov. 14, 2023

(54) FIRE WALL AND METHOD FOR OPENING SAME

(71) Applicant: SAFRAN AIRCRAFT ENGINES, Paris (FR)

(72) Inventors: Romain Harold Patrice Pou, Moissy-Cramayel (FR); Frédéric Dautreppe, Moissy-Cramayel (FR); Bertrand Romain Adrien Dufour, Moissy-Cramayel (FR); Frédéric Jacques Eugène Goupil, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/595,809

(22) PCT Filed: May 12, 2020

(86) PCT No.: PCT/FR2020/050779
§ 371 (c)(1),
(2) Date: Nov. 24, 2021

(87) PCT Pub. No.: WO2020/240107
PCT Pub. Date: Dec. 3, 2020

(65) Prior Publication Data
US 2022/0213839 A1    Jul. 7, 2022

(30) Foreign Application Priority Data
May 28, 2019 (FR) ...................................... 1905651

(51) Int. Cl.
*F02C 7/25* (2006.01)
(52) U.S. Cl.
CPC ............ *F02C 7/25* (2013.01); *F05D 2230/70* (2013.01)

(58) Field of Classification Search
CPC ...... F02C 7/32; F02C 7/04; F02C 7/20; F02C 7/25; F05D 2230/70; F05D 2230/60; F05D 2230/72
See application file for complete search history.

(56) References Cited

U.S. PATENT DOCUMENTS 10,054,006 B2 *  8/2018  Mercier ................. B64D 29/06
10,428,692 B2 * 10/2019  Parry ........................ F02C 7/20
(Continued)

FOREIGN PATENT DOCUMENTS

EP     1741879 A1    1/2007
FR     3030627 A1 *  6/2016 ........... F01D 25/162
(Continued)

OTHER PUBLICATIONS

French Search Report in FR Application No. 1905651, dated Feb. 3, 2020 (2 pages).
(Continued)

*Primary Examiner* — Thuyhang N Nguyen
(74) *Attorney, Agent, or Firm* — Bookoff McAndrews, PLLC

(57) ABSTRACT

The invention relates to a firewall (112) for a turbomachine (100) auxiliary arm (106). This firewall (112), which has one or more through openings (180) in a thickness direction (Z) of the firewall (112), comprises a fixed portion (120) and a first removable portion (130) extending, in a width direction (Y), orthogonal to said thickness direction (Z), from at least one adjacent opening among the through openings (180), to a first outer edge (190) of the firewall (112). To open this firewall (112) in order to allow access to one or more ducts and/or electrical cables (111) received in the through openings (180), the first removable portion (130) can be dismantled.

14 Claims, 5 Drawing Sheets

(56) References Cited

U.S. PATENT DOCUMENTS 10,526,915 B2 * 1/2020 Suciu ............ F01D 25/20
2020/0072080 A1 * 3/2020 Franklin ......... F01D 25/14

FOREIGN PATENT DOCUMENTS

GB 2497934 A 7/2013
WO 2015/028756 A1 3/2015

OTHER PUBLICATIONS

International Search Report issued in International Application No. PCT/FR2020/050779, dated Sep. 25, 2020 (2 pages).

* cited by examiner

[Fig. 1]
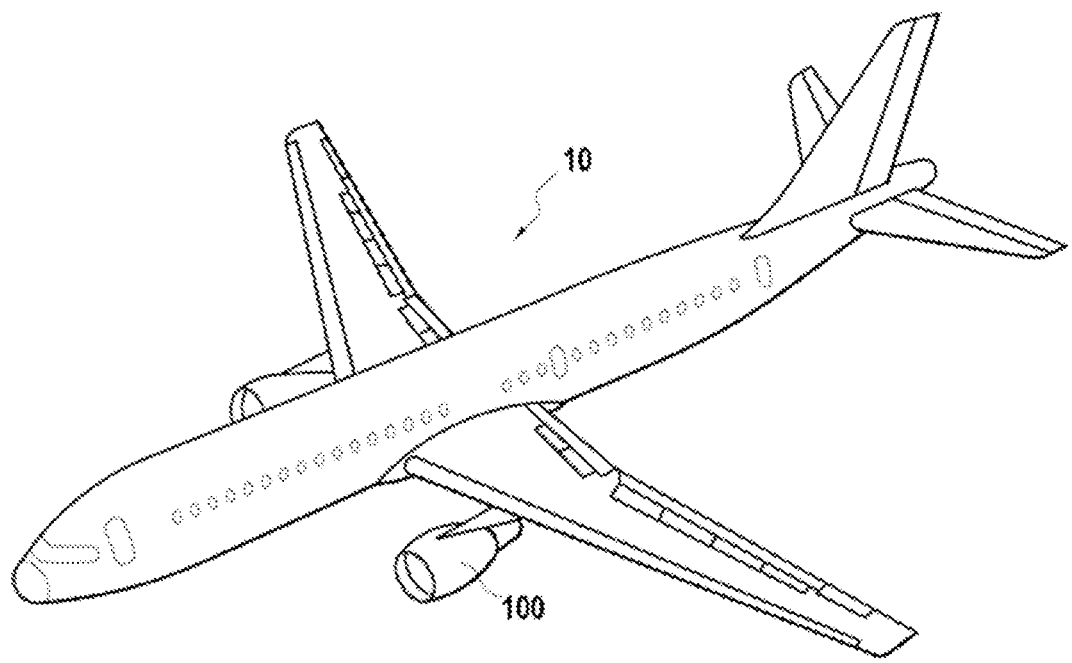
[Fig. 2]
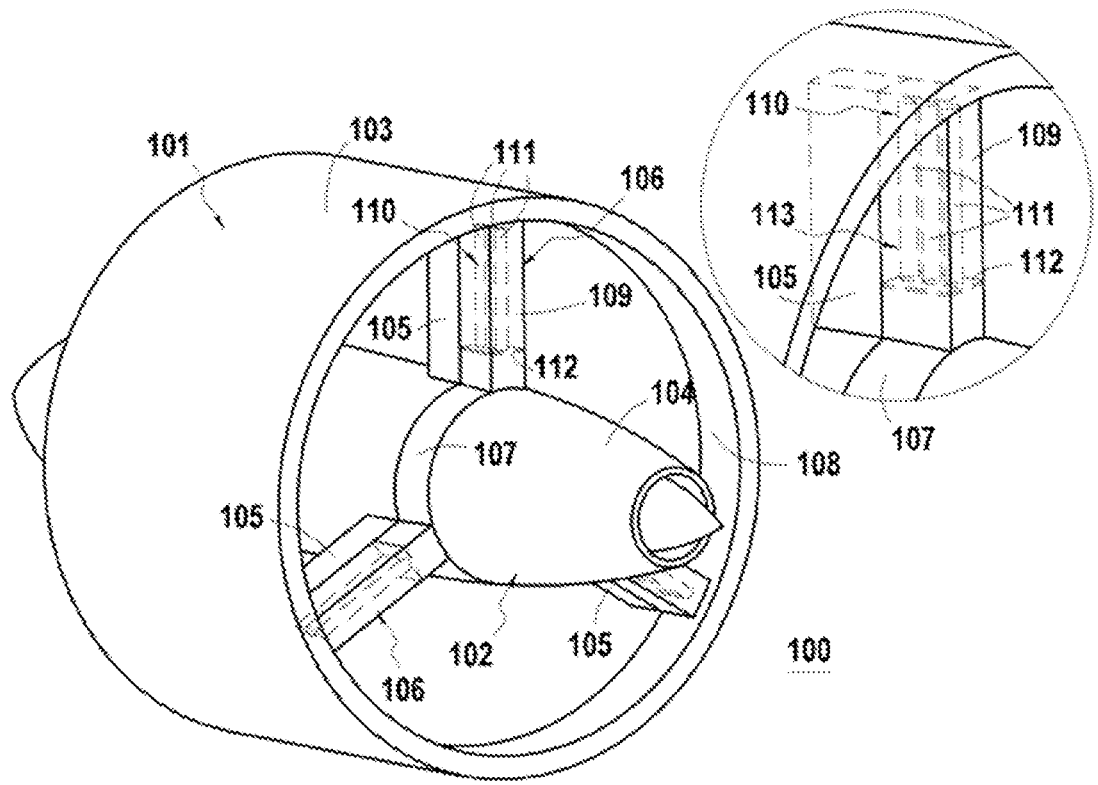

[Fig. 3]
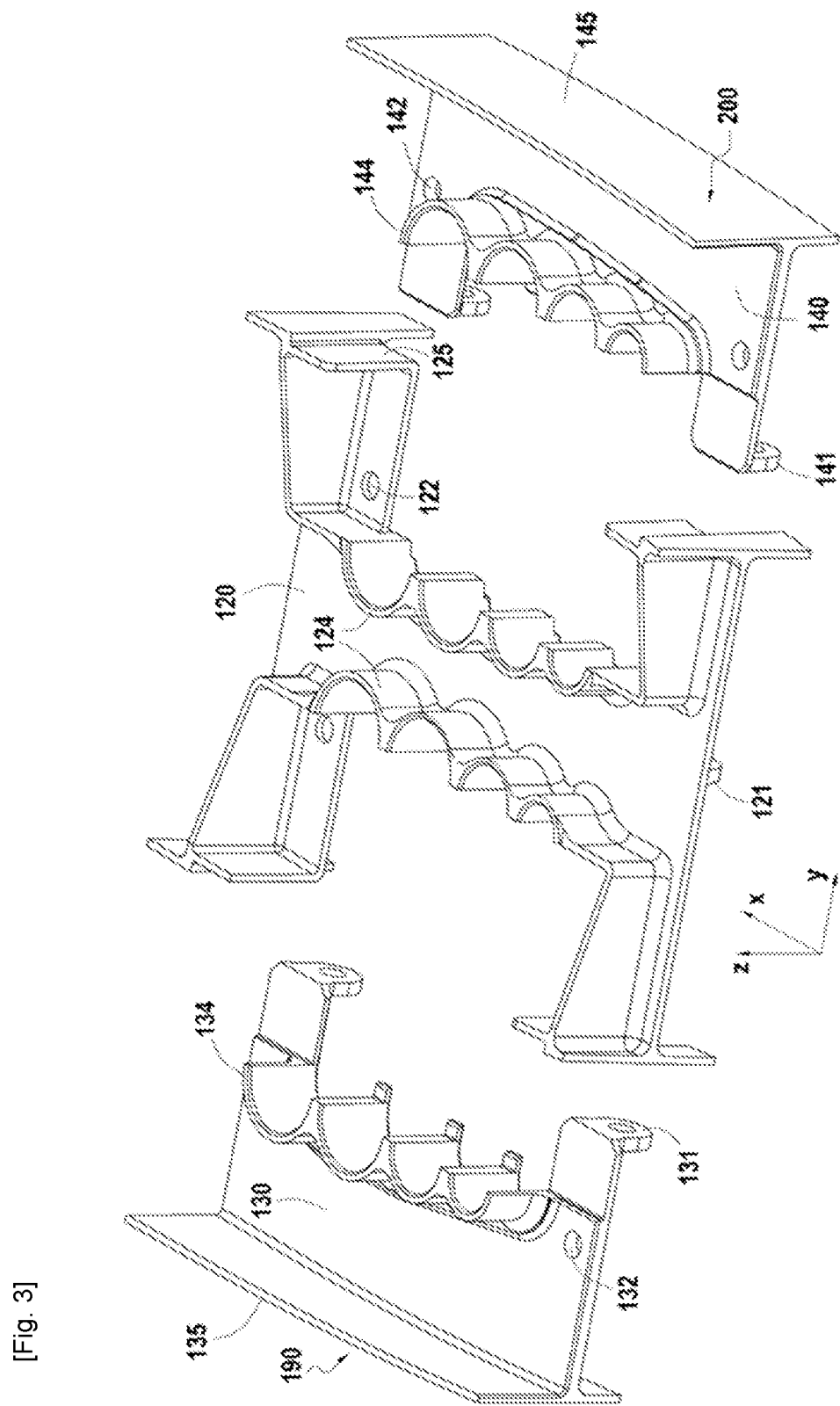

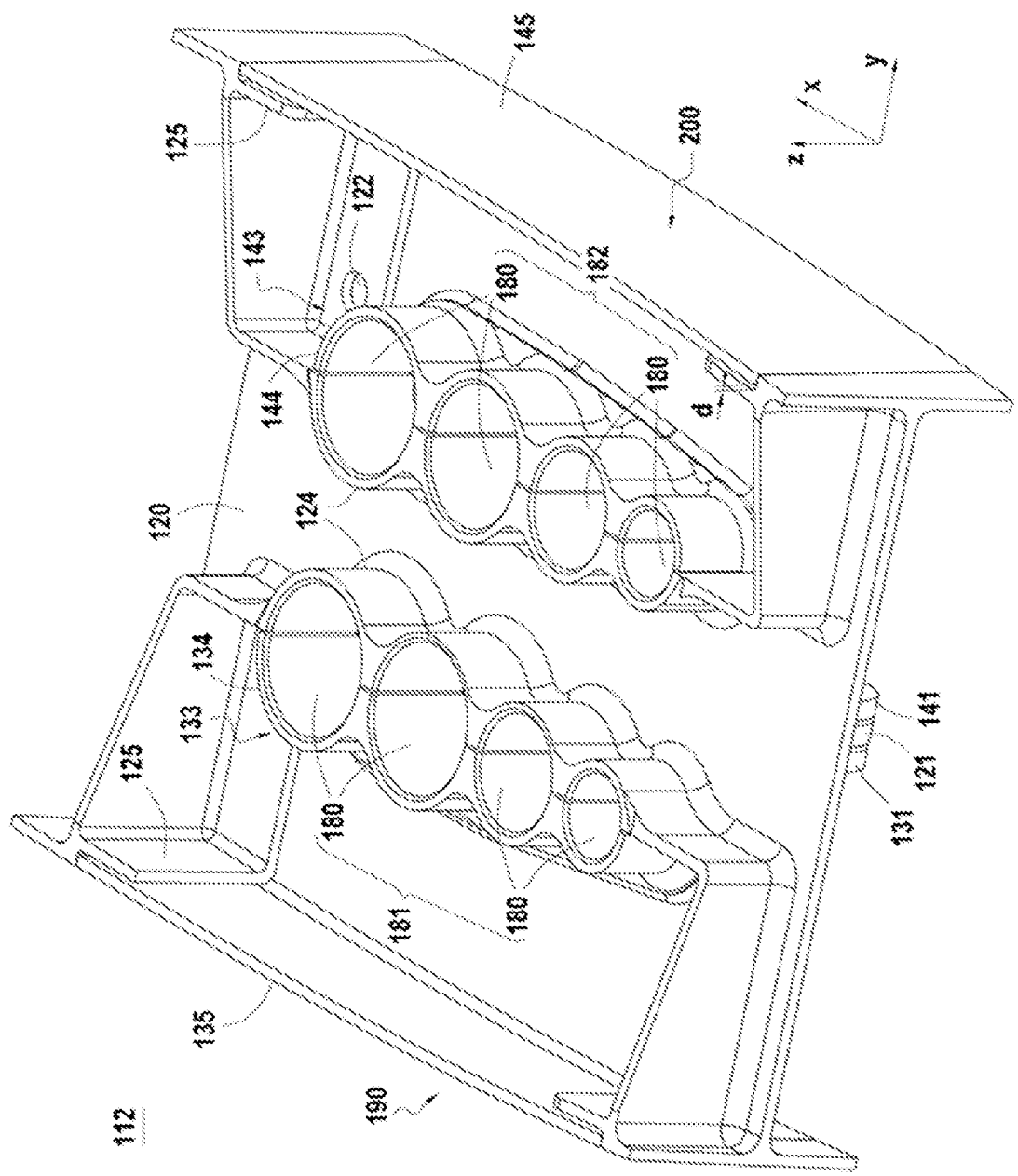
[Fig. 4A]

[Fig. 4B]
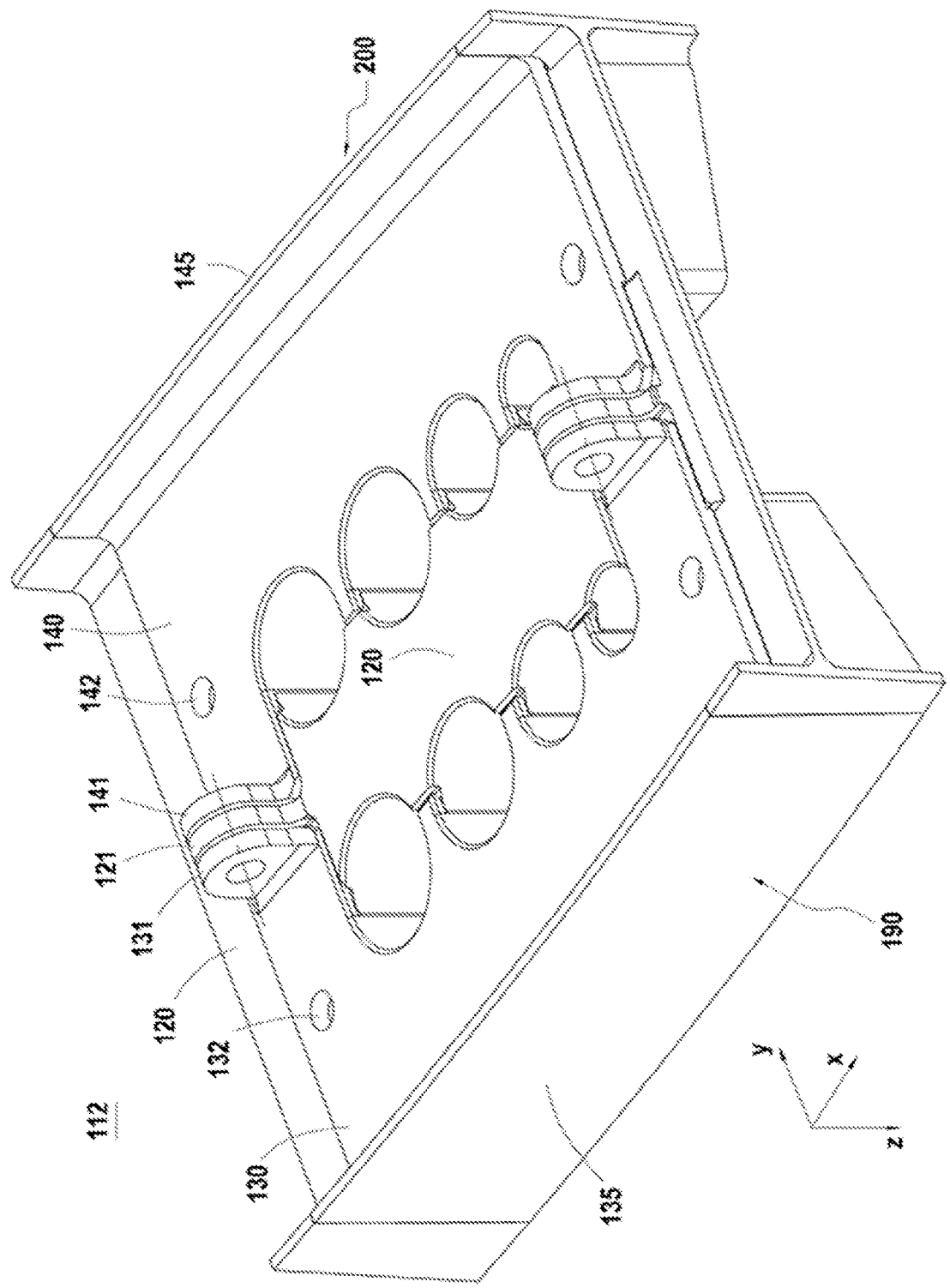

[Fig. 5]
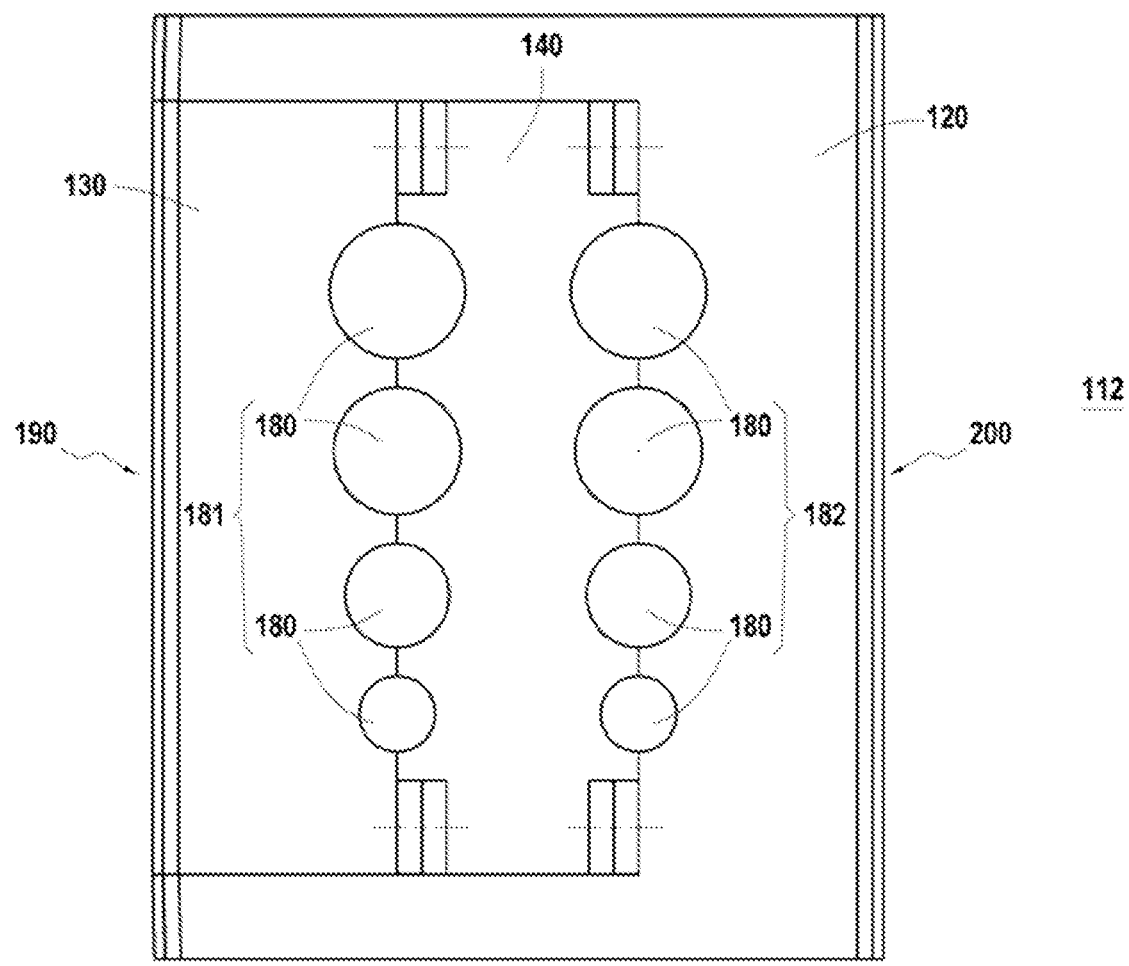

FIRE WALL AND METHOD FOR OPENING SAME

CROSS-REFERENCE TO RELATED APPLICATION(S)

This application is the U.S. national phase entry under 35 U.S.C. § 371 of International Application No. PCT/FR2020/050779, filed on May 12, 2020, which claims priority to French Patent Application No. 1905651, filed on May 28, 2019.

TECHNICAL FIELD

The present disclosure relates to the field of turbomachines, and particularly a firewall for an auxiliary arm of a turbomachine.

What is meant here by "turbomachine" is an assembly comprising, from upstream to downstream in a flow direction of a working fluid, a compressor, a combustion chamber, and a turbine connected mechanically by a rotating shaft to the compressor. Among turbomachines are therefore counted gas turbines, turbojets, turbofans, turboprops and turbine engines.

PRIOR ART

This disclosure relates in particular to turbofans, without however being limited to them. In fact, to allow the routing of fluids, such as fuel, lubricant or hydraulic fluid, as well as electricity, turbofans typically comprise auxiliary arms extending radially in the air stream of the fan, and receiving, within a tubular structure, bundles of ducts and/or electrical cables. One example of such auxiliary arms was disclosed in the publication of European patent application EP 1 741 879 A1.

In order to prevent the propagation of possible fires within said auxiliary arms, firewalls can be placed there transversely, with through openings for the passage of ducts and electrical cables extending inside the auxiliary arm. To ensure the sealing of the firewall, the ducts and/or electrical cables can be tightly received in these through openings, for example in sealing blocks attached to the firewall and in which these through openings are formed.

This arrangement had however the disadvantage of normally requiring the dismantling of the sealing blocks, to allow the extraction by passage through the firewall of even a single duct and/or cable for its inspection, its maintenance, its repair or its replacement. Moreover, a duct or a cable had to be disconnected at one of its two ends at least to allow it to be extracted by passage through and opening of the firewall, which during operation is occupied by a sealing block, once the sealing block which surrounds this duct or cable is dismantled. This extending the duration of the dismantling in situations for which it is desirable to dismantle the auxiliary arm assembly. The dismantling of the auxiliary arm necessitated disconnecting all the ducts and/or cable in order to free them from the firewall.

DISCLOSURE OF THE INVENTION

The present disclosure has the purpose of solving this disadvantage by proposing a firewall facilitating access to each duct and/or electrical cable passing through it.

To this end, a firewall for a turbomachine auxiliary arm according to the present disclosure can comprise one or more through openings in a thickness direction of the firewall, a fixed portion, and a first removable portion extending, in a width direction, orthogonal to said thickness direction, from at least one adjacent opening among the through openings, to a first outer edge of the firewall.

Due to this arrangement, by separating the first removable from the fixed portion, it is possible to gain access directly from the outside to a duct or electrical cable received in said adjacent opening, even to extract it individually from it. It is therefore not necessary to pass a duct or an electrical cable through an opening of the firewall to extract it. Moreover, the ducts and/or cables generally have sufficient flexibility or pliability to be removed from the firewall without having to disconnect their ends, which allows withdrawing the auxiliary arm by moving it in the downstream direction of the turbomachine while leaving in place the ducts and/or cables. The fact of not having to disconnect the ducts and/or cables contributes a substantial time saving for an operation of dismantling and withdrawal of the auxiliary arm.

To receive several ducts and/or electrical cables, the firewall can comprise one or two rows of said through openings, each extending in a length direction, orthogonal to said thickness and width directions.

If the firewall comprises a first row and a second row of said through openings passing through said rows, the fixed portion of the firewall can extend in the length direction between them, the first removable portion can extend from the first row to the first outer edge and a second removable portion of the firewall can extend from the second row to a second outer edge of the firewall, opposite to the first outer edge.

Alternatively, however, said first removable portion can extend from the first row to the first outer edge and the second removable portion of the firewall extend between the first and second rows. In this second case, in order to ensure good sealing of the firewall, the second removable portion can overlap an adjacent surface of the fixed portion and the first removable portion can overlap an adjacent surface of the second removable portion. Moreover, the first and second removable portions can comprise jaws connected by one or more bolts, so as to releasably attach the first removable portion to the second removable portion.

In order to ensure good sealing of the firewall, the first removable portion can overlap an adjacent surface of the fixed portion.

In order to increase the stiffness of the firewall, but also to ensure good sealing between the firewall and each through opening, the first removable portion can comprise an inner stiffener, protruding in the thickness direction, located on a perimeter of the at least one adjacent opening among the through openings.

Also in order to increase the stiffness of the firewall while ensuring its sealing, the first removable portion can have, on the first outer edge, an outer stiffener, protruding in the thickness direction, which overlaps a fitting of an adjacent stiffener of the fixed portion of the firewall.

To releasably attach the first removable portion to the fixed portion, the first removable portion and the fixed portion can comprise jaws connected by one or more bolts.

This disclosure also relates to a turbomachine auxiliary arm, which can comprises a tubular structure, one or more ducts and/or electrical cables inside the tubular structure and the firewall mentioned above, and in which the ducts and/or electrical cables can pass through the firewall by the through openings, as well as a turbomachine which can comprise at least one auxiliary arm of this type, which can extend radially between the two axial shrouds, particularly for passing through an air stream of a fan of the turbomachine.

Finally, this disclosure also relates to a method for opening the firewall mentioned above, comprising a step of dismantling the first removable portion to allow access to one or more ducts and/or electrical cables received in the through openings.

The invention will be better understood and its advantages will appear more clearly upon reading the detailed description that follows, of an embodiment shown by way of a non-limiting example. The description refers to the appended drawings, in which:

BRIEF DESCRIPTION OF THE DRAWINGS

FIG. 1 is a schematic view of an aircraft equipped with turbofans.

FIG. 2 is a schematic view of one of the turbofans of the aircraft of FIG. 1, which auxiliary arms passing radially through the air stream of the fan.

FIG. 3 is an exploded view of a first embodiment of a firewall intended for one of the auxiliary arms of FIG. 2.

FIG. 4A is a first perspective view of the firewall of FIG. 3.

FIG. 4B is a second perspective view of the firewall of FIG. 3.

FIG. 5 is a schematic view of a second embodiment of a firewall intended for one of the auxiliary arms of FIG. 2.

DESCRIPTION OF THE EMBODIMENTS

As illustrated in FIG. 1, an aircraft 10 can be equipped with turbomachines, particularly in the form of turbofans 100. As illustrated in FIG. 2, these turbofans 100 can comprise a fan 101 and an engine core 102, with respective coaxial casings 103, 104. To retain the concentricity of the casings 103, 104, these can be connected by structural arms 105 extending radially through the air stream of the fan 101.

In order to allow the routing of fluids and or of electricity between the casing 103 of the fan and the casing 104 of the engine core 102, the turbofan 100 can also include auxiliary arms 106 extending radially, through the air stream of the fan 101, of an inner shroud 107 integrated with the casing 104 of the engine core 102, to an outer shroud 108 integrated with the casing 103 of the fan 101. These auxiliary arms 106 can be adjacent to the structural arms 105, directly downstream of them in the flow direction of the air in the air stream of the fan 101.

Each of the auxiliary arms 105 can comprise a tubular structure 109 and a bundle 110 of ducts and/or cables 111 extending inside this tubular structure 108. Although the auxiliary arms 105 illustrated have tubular structures 108 with an essentially rectangular cross section, other forms of transverse section are also conceivable. In order to allow access to the inside of the tubular structure 108, this can comprise outer walls 113 which can be dismantled. In order to avoid the propagation of fire inside, each auxiliary arm 105 can also comprise at least one firewall 112, which can be arranged transversely inside the tubular structure 108.

As illustrated in FIGS. 3, 4A and 4B, in at least a first embodiment, the firewall 112 can comprise a fixed portion 120 and two removable portions 130, 140. The fixed portion 120 can be integral with the tubular structure 108 of the auxiliary arm 105, while each of the removable portions 130, 140 can be releasably connected to the fixed portion 120 by bolts (not illustrated). At least one of these bolts can be oriented in the width direction Y of the firewall 112 to connect the jaws 121, 131, 141 protruding in the thickness direction Z of the firewall 112, respectively on the fixed portion 120, the first removable portion 130 and the second removable portion 140 of the firewall 112. Other bolts can be oriented in the thickness direction Z of the firewall 112 to connect, respectively, the first removable portion 130 and the second removable portion 140 to the fixed portion 120. To allow the passage of these other bolts, the fixed portion 120 can have openings 122 aligned with corresponding openings 132, 142 in the respective overlap zones 133, 143. These overlap zones 133, 143 in which the fixed portion 120 can overlap, in the thickness direction Z, with the first and second removable portions 130, 140 respectively, allow also ensuring good sealing of the firewall 112.

As also illustrated in FIGS. 4A and 4B, the firewall 112 can have one or more through openings 180 to allow the passage of the ducts and/or electrical cables 111 of the bundle 110. If the firewall 112 can comprise a plurality of through openings 180 of this type, these can be arranged in one or more rows 181, 182. Each of these rows 181, 182 can extend in the length direction X of the firewall 112. In order to ensure good sealing of the firewall 112 around each duct or electrical cable 110, these through openings 180 can be dimensioned so that each duct or electrical cable 111 is tightly surrounded there, and their perimeter have a noticeable excess thickness which can form the stiffeners 124, 134, 144 protruding in the thickness direction Z on, respectively, the fixed portion 120, the first and second removable portions 130, 140.

As also illustrated in FIGS. 4A and 4B, the first removable portion 130 can extend from the first row 181 of through openings 180 to a first outer edge 190 of the firewall 112, while the second removable portion 140 can extend from the second row 182 of through openings 180 to a second outer edge 200 of the firewall 112, on a side opposite to the first outer edge 190. Thus, in a method for opening the firewall 112, the first removable portion 130 can be dismantled to allow access to the ducts and/or electrical cables 111 received in the first row 181 of through openings 180, in order to allow their individual inspection, maintenance repair and or replacement, while the second removable portion 140 can be dismantled to allow access to the ducts and/or electrical cables 111 received in the second row 182 of through openings 180, in order to allow their individual inspection, maintenance, repair and or replacement.

The stiffener 124 of the fixed portion 120 can extend until the outer edges 190, 200 of the firewall 112, and have at this location fittings 125 allowing the superposition of outer stiffeners 135, 145, also protruding in the thickness direction Z over the adjacent ends of the stiffener 124. This overlap, which can have a clearance d, for example, of 1 mm in the width direction Y, also allows ensure good sealing of the firewall 112 with the outer edges 190, 200 in contact with the walls of the tubular structure 108.

As in the alternative embodiments illustrated schematically in FIG. 5, it is also conceivable that the second removable portion 140 extends rather between the two rows 181, 182 of through openings 180, and that the fixed portion 120 comprises a segment interposed between the second row 182 and the second outer edge 200 of the firewall 112. In order to connect them releasably, the first and second removable portions 130 can comprise jaws connected by one or more bolts. To ensure good sealing between the removable portions 130, 140 and between the second removable portion 140 and the fixed portion, the second removable portion 140 can overlap an adjacent surface of the fixed portion 120 and the first removable portion 130 overlap an adjacent surface of the second removable portion 140.

In the second embodiment, the first removable portion 130 can be individually dismantled to allow access to the ducts and/or the electrical cables 111 received in the first row 181 of through openings 180, in order to allow their individual inspection, maintenance, repair and or replacement, while the two removable portions 130, 140 can be dismantled to allow access to the ducts and/or the electrical cables 111 receive in the second row 182 of through openings 180, in order to allow their individual inspection, maintenance, repair and/or replacement.

Although the present invention has been described by referring to specific examples, it is clear that different modifications and changes can be applied to these examples without departing from the general scope of the invention as defined by the claims. Consequently, the description and the drawings can be considered in an illustrative, rather than a restrictive sense.

The invention claimed is:

1. A turbomachine auxiliary arm, comprising:
a tubular structure;
one or more ducts and/or electrical cables inside the tubular structure; and
a firewall comprising through openings in a thickness direction of the firewall, a fixed portion extending, in a width direction, orthogonal to said thickness direction, and a first removable portion extending in the width direction from at least one adjacent opening among the through openings, to a first outer edge of the firewall;
wherein the fixed portion and first removable portion of the firewall are arranged transversely inside the tubular structure, and the ducts and/or electrical cables pass through the firewall by the through openings.

2. The turbomachine auxiliary arm according to claim 1, wherein the firewall comprises one or two rows of said through openings, each extending in a length direction, orthogonal to said thickness and width directions.

3. The turbomachine auxiliary arm according to claim 2, wherein said rows comprise a first row and a second row between which the fixed portion of the firewall extends in the length direction, the first removable portion extends from the first row to the first outer edge and a second removable portion of the firewall extends from the second row to a second outer edge of the firewall, opposite to the first outer edge.

4. The turbomachine auxiliary arm according to claim 2, wherein said rows comprise a first row and a second row, said first removable portion extends from the first row to the first outer edge and a second removable portion of the firewall extends between the first and second rows.

5. The turbomachine auxiliary arm according to claim 4, wherein the second removable portion overlaps an adjacent surface of the fixed portion and the first removable portion overlaps an adjacent surface of the second removable portion.

6. The turbomachine auxiliary arm according to claim 4, wherein the first and second removable portions comprise jaws connected by one or more bolts.

7. The turbomachine auxiliary arm according to claim 1, wherein the first removable portion overlaps an adjacent surface of the fixed portion.

8. The turbomachine auxiliary arm according to claim 1, wherein the first removable portion comprises an inner stiffener, protruding in the thickness direction, located on a perimeter of the at least one adjacent opening among the through openings.

9. The turbomachine auxiliary arm according to claim 1, wherein the first removable portion has, on the first outer edge, an outer stiffener, protruding in the thickness direction, which overlaps a fitting of an adjacent stiffener of the fixed portion of the firewall.

10. The turbomachine auxiliary arm according to claim 1, wherein the first removable portion and the fixed portion comprise jaws connected by one or more bolts.

11. A turbomachine comprising at least one turbomachine auxiliary arm according to claim 1.

12. The turbomachine according to claim 11, wherein the at least one turbomachine auxiliary arm extends radially between two coaxial shrouds.

13. The turbomachine according to claim 12, wherein the at least one turbomachine auxiliary arm passes through an air stream of a fan of the turbomachine.

14. A method of opening the firewall of the turbomachine auxiliary arm according to claim 1, comprising a step of dismantling the first removable portion to allow access to the one or more ducts and/or electrical cables received in the through openings.

* * * * *